United States Patent [19]
Sato

[11] 3,945,464
[45] Mar. 23, 1976

[54] OIL-INJECTION-TYPE ROTARY COMPRESSOR HAVING A CENTRIFUGAL WATER SEPARATOR

[75] Inventor: Goro Sato, Atami, Japan

[73] Assignee: Hokuetsu Kogyo Co. Ltd., Niigata, Japan

[22] Filed: Dec. 19, 1973

[21] Appl. No.: 425,994

[30] Foreign Application Priority Data
Jan. 13, 1973  Japan................................ 48-6305
Apr. 18, 1973  Japan.............................. 48-43111

[52] U.S. Cl.............. 184/6.16; 233/23 R; 184/6.24
[51] Int. Cl.² ........................................ B04B 11/00
[58] Field of Search ............ 184/6, 6.16, 6.21, 6.24; 233/23 R

[56] References Cited
UNITED STATES PATENTS

| | | | |
|---|---|---|---|
| 2,701,684 | 2/1955 | Hirsch................................ | 184/6.16 |
| 2,723,079 | 11/1955 | Fulton................................ | 233/23 R |
| 3,722,187 | 3/1973 | Potter................................ | 184/6.16 |
| 3,784,092 | 1/1974 | Gibson............................... | 233/23 R |
| 3,791,576 | 2/1974 | Bazil................................. | 233/23 R |

Primary Examiner—Richard C. Pinkham
Assistant Examiner—Marvin Siskind

[57] ABSTRACT

An oil-injection-type rotary compressor having a centrifugal water separator which is disposed in the cooling and lubricating oil system thereof, and which is characterized in that water particles contained in the cooling and lubricating oil are automatically separated either continuously or intermittently from the lubricating oil and are discharged therefrom to the exterior of the compressor.

4 Claims, 9 Drawing Figures

OIL-INJECTION-TYPE ROTARY COMPRESSOR HAVING A CENTRIFUGAL WATER SEPARATOR

BACKGROUND OF THE INVENTION

The present invention relates to an oil-injection-type rotary compressor. At present, widely employed are such compressors of the slide vane type, the screw type, the worm type and the like in which cooling and lubricating oil is directly injected into the compressed gas in order to enhance the cooling effect and to obtain the higher compression efficiency of the compressor. Moreover, the machinery of these types is, as compared with any conventional one of the reciprocating type, featured in that it will cause remarkably less public nuisances and troubles such as vibration, noise and the like, and therefore it is outstandingly superior thereto.

However, the oil-injection-type rotary compressor in which cooling and lubricating oil is directly injected into the compressed gas is endowed with its only one defect that it is frequently suffered from such a trouble that, during its operation with highly humid suction gas, the sucked water vapour contained therein is reached to its dew point in relation to the temperature thereof, and thus condensed water particles are mixed with the cooling and lubricating oil so as to allow the oil to become emulsified.

In the case where the ambient air is sucked into the oil-injection-type rotary compressor to get compressed, if the ambient air to be sucked is highly heated and humid, the dew point of the vapour is elevated as the compression pressure is increased, and even though both the temperatures of the cooling and lubricating oil itself and of that contained in the compressed air circulating system are very high, the water vapour is condensed to form a lot of water drops suspended in the cooling and lubricating oil, and the oil and water drops are agitated and combined into mineral particles mixing with each other, in the compression chamber of the compressor and in the oil pump for the compressor, until the mixed oil water particles are entirely converted to a colloidal phase so as to form a kind of petroleum emulsion, thus resulting in that the oiliness is lost and failure of the compressor is possibly caused thereby. In addition, a phenol resin vane used in slide-vane type compressor and phenol resin pinion used in worm type compressor absorb the water particles contained in lubricating oil and is expanded, resulting in that the compressing function of the vane is impaired, or otherwise, the vane and pinion might be broken down.

Heretofore, a generally adopted method to prevent emulsification as described above was such that the temperature of the cooling and lubricating oil supplied to the compressor was maintained above a definite temperature while the compressor was operated, and the water vapour contained in the sucked air was discharged, in the form of vapour as it had been, out of a discharge port of the compressor.

Therefore, the temperature of the cooling and lubricating oil could not be lowered below a definite temperature and was kept at a higher temperature at which the lubricating oil was quickly oxidized so as to accelerate the deterioration of the lubricating oil, resulting in such a short effective life of the oil as 1,000 hours at most. Furthermore, the suction efficiency of the atmospheric air sucked into the compressor was also impaired due to its high temperature involved by a higher level of the temperature of the cooling and lubricating oil, said level being required as the temperature of the oil supplied to the compressor.

Moreover, for the purpose of maintaining the operating temperature of the cooling and lubricating oil above the definite temperature level, even if the temperature of the oil is regulated by means of a temperature regulating device, i.e., an element such as a so-called thermostat, in such a case where the amount of the compressed air being put to use at its discharging side is extremely limited to only a little, the heat energy generated by the compression is remarkably decreased so that it is difficult to keep both the temperature of the discharged air and the temperature of the lubricating oil to respective appropriate levels, consequently, condensed water particles are increasingly contained in and mixed with the cooling and lubricating oil within its circulating system. Therefore, it was a customary practice to discharge, at least once a day, the gathered water in a lubricating oil reservoir by opening a drain cock at the bottom of the reservoir when the temperature of the cooling and lubricating oil in the reservoir has lowered down after the operation of the compressor was interrupted or terminated.

However, this method cannot be put into a practical use in such a case where the compressor are operated continuously for many day on the basis of a complete 24 hours daily operation, and therefore the cooling and lubricating oil would be soon deteriorated inevitably.

Recently, requirements for the 24 hours continuous work lasting for great many weeks to meet the work with a high pressure and to carry out the continuous non-attendant operation are frequently called for, therefore if the contaminated water particles in the cooling and lubricating oil are not automatically separated and discharged therefrom during the operation, whatsoever the oil injection type rotary compressor may be superior in its performance, and there may occur a least public nuisance and trouble such as vibration, noise and the like, it will not be reliable and may be discontinued to be used in some cases.

The object of the present invention is to provide an oil-injection-type rotary compressor in which the suction efficiency of the compressor is improved and the deterioration of the cooling and lubricating oil due to oxidation thereof is prevented by lowering the temperature of the cooling and lubricating oil which is being supplied to the compressor, in addition, the water particles mixed with the cooling and lubricating oil are automatically removed therefrom either continuously or intermittently and discharged to the exterior thereof by means of a centrifugal water separator inserted in the path of the cooling and lubricating oil, whereby, the effective life of the cooling and lubricating oil is extended over 10,000 hours and it is also made possible to operate the compressor continuously for a long period of many weeks.

On the other hand, in an oil-injection-type rotary compressor of a high pressure, as the dew point under the high pressure becomes higher than the oxidation temperature for the cooling and lubricating oil, the emulsifying function for the cooling and lubricating oil is accelerated remarkably in response thereto. Therefore, it has been found that the oil injection type rotary compressor can not be put in use under such a high pressure. But, according to the present invention, this problem is also solved so that the range of the available pressures of the oil injection type rotary compressor can be further extended.

It is in general told that water and oil are hard to be mixed with each other, but actually, water and oil are easily and well mixed to make up a mixture thereof. When water is merely added into oil, the water is kept completely separated from the oil, however, if they are either agitated violently or broken into mineral particles by passing them through a gear pump, the oil and water are fully mixed together to change into a turbid white emulsion and if this state of emulsion is once made up, although anybody tries to separate oil from water by any means, he will never succeed therein under the ambient temperature.

Now, it was found by our experiments that even the oil and water mixed to form an emulsified phase can be separated gradually in response to its temperature elevated higher than the normal temperature. In the passage of the cooling and lubricating oil having a high temperature before the time when the cooling and lubricating oil was cooled by a cooler, was inserted a centrifugal water separator, by means of which it has become possible to completely separate oil from the mixed water.

As a result of various experiments, in separating emulsified water in cooling and lubricating oil by centrifugal separator, it is found that oil and water are different in the rate of variation of viscosity to that of temperature and in the rate of variation of surface tension to that of temperature so that it is difficult to separate them from each other and that it is possible to separate them by means of elevation of temperature of oil, and if suitable peripheral speed is given to the centrifugal separator corresponding to the temperature of oil and water, it is possible to separate oil from water with ease. Namely, it is found that if periperhal speed N m/sec of the centrifugal separator and oil temperature T°C are defined within the range where the upper limit is expressed by $$\frac{N^2}{150^2} + \frac{T^2}{155^2} = 1$$

and the lower limit is expressed by $$0.049 \ N^2 + 0.605 \ N + T = 55$$

oil and water can be perfectly and easily separated from each other under any condition.

SUMMARY OF THE INVENTION

According to the present invention, there is provided and oil injection type rotary compressor having a centrifugal water separator which is provided in cooling and lubricating system, and which is characterized in that water particles contained in the cooling and lubricating oil therein is automatically separated either continuously or intermittently from the lubricating oil and is discharged to the exterior of the compressor.

According to the present invention, there is provided an oil injection type rotary compressor having the centrifugal water separator as described above, wherein, made use of as a power source of the centrifugal water separator is the cooling and lubricating oil itself, of which the pressure difference between the inlet and the outlet thereof is designed so as to be higher than 1 kg/cm², and that the centrifugal water separator is operated by the flow of the cooling and the lubricating oil itself.

According to the present invention, there is provided an oil injection type rotary compressor having the centrifugal water separator as described above, wherein, no external power is put to use therein as the power source to force the centrifugal water separator to be rotated, and that the centrifugal water separator is operated by making use of the flow of a pressurized gas flowing through the interior of the compressor.

According to the present invention, there is provided an oil injection type rotary compressor having the centrifugal water separator as described above, wherein, the centrifugal water separator is operated by making use of a portion of the pressurized gas discharged out of the compressor to the exterior thereof.

According to the present invention, there is provided an oil injection type rotary compressor having the centrifugal water separator as described above, wherein, the centrifugal water separator is operated under the condition where peripheral speed N m/sec of the centrifugal separator and oil temperataure T°C are defined within the range where the upper limit is expressed by $$\frac{N^2}{150^2} + \frac{T^2}{155^2} = 1$$

and the lower limit is expressed by $$0.049 \ N^2 + 0.605 \ N + T = 55$$

Several embodiments of the present invention will be described hereinbelow with reference to the accompanying drawings.

DETAILED DESCRIPTION OF THE PREFERRED EMBODIMENTS

Figure 1:
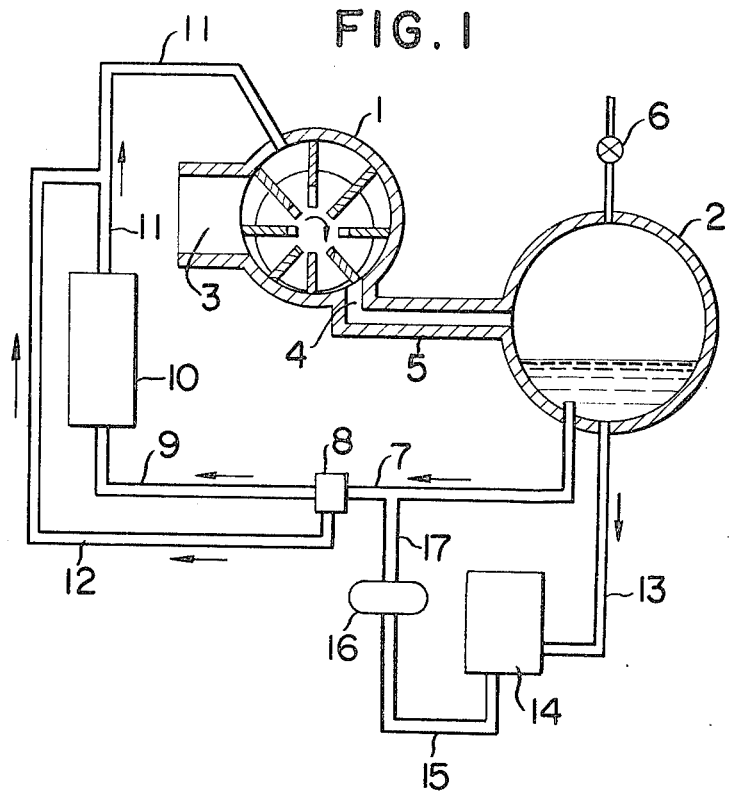
FIG. 1 is a circulating system diagram of cooling and lubricating oil in an oil injection type rotary compressor showing an embodiment of the present invention.

Describing now the present invention with reference to the drawings, FIG. 1 is a circulating system diagram of the cooling and lubricating oil in an oil injection type rotary compressor in accordance with an embodiment of the present invention, said compressor being an air compressor in this case. An oil injection type rotary compressor of the slide vane type will be hereinafter described, but the description can be similarly adapted to the same of the screw type and worm type, which is therefore to be included in the present invention.

Referring to FIG. 1, the reference numeral 1 denotes a rotary compressor in section, which compressor 1 is provided with an air suction port 3 and an air discharge port 4. A pressure vessel and oil separator 2 is connected at its one side portion with the discharge port 4 via an outlet pipe 5, and a service header 6 is connected to the top portion of the oil separator 2.

Connected in sequence to a conduit 7 which is opened at the bottom of the oil separator 2 are a temperature regulating device 8, a conduit 9, a cooler 10, and a conduit 11, which is in turn connected to the compression chamger in the compressor 1. The temperature regulating device 8 is directly interconnected with the conduit 11 through a by-pass conduit 12.

Moreover, connected in sequence to a conduit 13 which is also opened at the bottom of the oil separator 2 are a centrifugal water separator 14, a conduit 15, a pump 16, and a conduit 17, which is in turn connected with the conduit 7.

Figure 2:
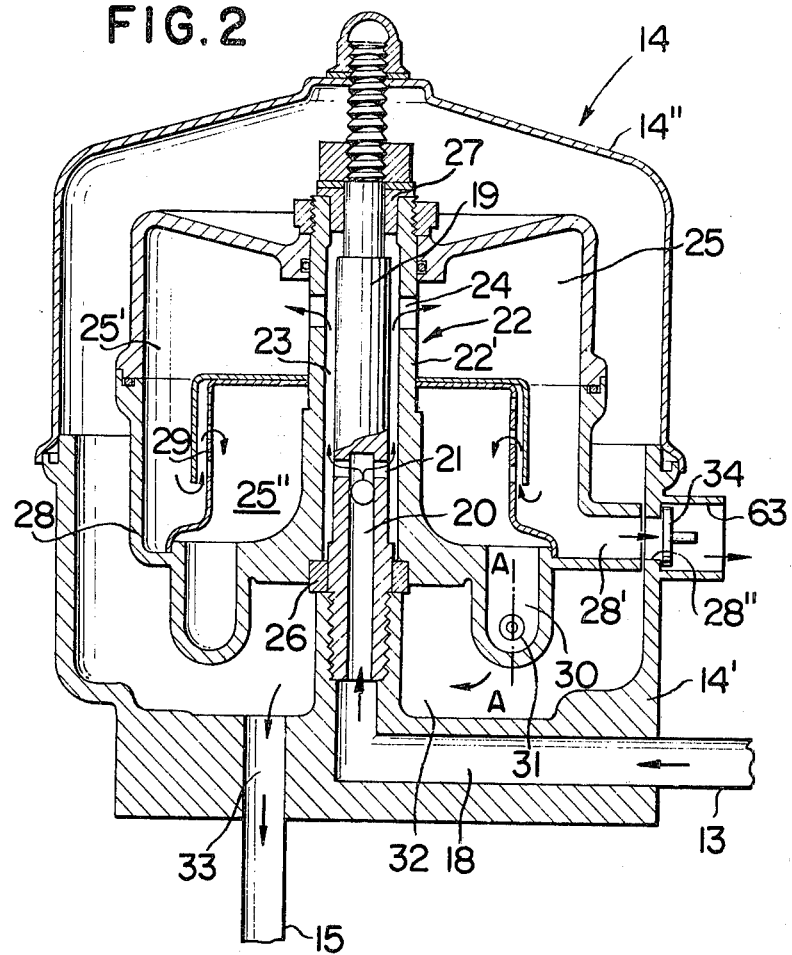
FIG. 2 is a sectional elevation view showing a water separator by the centrifugal separating process in accordance with one embodiment of the present invention.

Referring nextly to FIG. 2 in which shown is a sectional elevation view of the centrifugal water separator 14, the centrifugal water separator 14 comprises a hollow body 14' and a cover 14'' sealed to the top periphery of the body 14' the interior of which constitutes a low pressure chamber 32 and an entrance chamber 18 which is located underneath the low pressure chamber 32, and the entrance chamber 18 is connected to the conduit 13,, whereas, the low pressure chamber 32 is connected to the conduit 15. A shaft 19 is disposed along the vertical center axis of the body 14', and the upper and lower ends of the shaft 19 are respectively secured to the cover 14'' and the body 14'. The shaft 19 is provided at its lower half section with an elongated hollow 20 which communicates to the exterior of the shaft 19 through a hole 21 disposed at the upper portion of the hollow 20, and of which the lowest end communicates with the entrance chamber 18.

A rotary unit 22 is journalled at its shaft-like part 22' by bearings 26 and 27 which are provided at the upper and lower ends of the shaft 19 so as to be rotatable about the shaft 19, and a hollow space 23 is constituted between the shaft-like part 22' of the rotary unit 22 and the shaft 19, said hollow space 23 communicating with the central hollow 20 in the shaft 19 through the hole 21 thereof.

The rotary unit 22 is comprised of a drum-like outer wall 28 which is integrally connected to the lower part of the shaft-like part 22' and extended outward therefrom to constitute a rotational chamber 25 between the outer wall 28 and the peripheral surface of the shaft-like part 22'. Disposed within the rotational chamber 25 is a drum-shaped filter 29 on account of which the rotational chamber 25 is sectioned so as to form two rooms, an outer room 25' and a inner room 25''. Provided at the upper part of the shaftlike part 22' of the rotary unit 22 are several holes 24 through which the aforesaid hollow space 23 communicates with the outer room 25'.

A number of dependent chambers 30, which are downward projected from the bottom of the outerwall 28 of the rotary unit 22 into the low pressure chamber 32, communicates with the lower room 25'' through top openings thereof, and each dependent chamber 30 is provided at its side wall with an ejection nozzle 31 from which the ejected fluid is radially directed with respect to the rotary unit 22. (Refer to FIG. 3)

The outerwall 28 is provided at one lower side portion thereof with an aperture 28' which is capable of being coincided with an aperture 28'' which is provided on the body 14' of the water separator 14, and which is connected to a conduit 63 having a valve 34 fitted thereinto.

With the rotary compressor so far constituted, atmospheric air is sucked through the suction port 3 into the compressor 1, and the compressed gas with pressure is discharged from the discharge port 4, and it is fed through the outlet pipe 5 into the pressure vessel and oil separator 2. The pressurized gas is sent out from the compressor through the service header 6 for any service required.

The cooling and lubricating oil stored in the bottom of the pressure vessel and oil separator 2 is, by the pressure of the pressurized gas, ejected into the compression chamber in the compressor 1 through the conduit 7, the temperature regulating device 8, the conduit 9, the cooler 10 and the conduit 11.

So long as the temperature of the cooling and lubricating oil passing through the conduit 7 is pretty low, a part of the cooling and lubricating oil from the temperature regulating device 8 is by-passed so as to be directly sent to the conduit 11 via the by-pass conduit 12 without passing through the cooler 10, for the purpose of quickly bringing the temperature of the cooling and lubricating oil ejected into the compression chamber of the compressor 1 to a definite value which is to be maintained at all times.

On the other hand, in the while the compressor 1 is continuously operated for a long time of hours, the water vapor contained in the atmosphere is condensed to become varied to water particles during its stay in the pressure vessel and oil separator 2, so that the water particles are brought to be mixed with the cooling and lubricating oil in the bottom part of the pressure vessel and oil separator 2, resulting in the emulsification of the oil. This cooling and lubricating oil thus emulsified flows into the conduit 7 through the conduit 13, the centrifugal water separator 14, the conduit 15, the pump 16, and the conduit 17.

The pump 16 provided therein is functional to create a pressure difference between the inlet and the outlet of the cooling and lubricating oil flowing into and from the centrifugal water separator 14, that is, the function of the pump 16 is to set up a pressure difference between the pressure in the conduit 13 and that in the conduit 15. Therefore, this pump may be disposed on the side of the conduit 13, or else in the case where an appropriate pressure difference is created between the inlet and the outlet of the cooling and lubricating oil flowing through the centrifugal water separator 14, it is not necessarily required to provide the pump 16 as shown in the drawing.

In the centrifugal water separator 14, as shown in FIG. 2, the cooling and lubricating oil in the state of the turbid white emulsion is first entered into the elongated hollow 20 of the shaft 19 from the conduit 13 via the entrance chamber 18, then flows into the hollow space 23 between the peripheral surface of the shaft 19 and the inner surface of the shaft-like part 22' of the rotary unit 22 via the hole 21 of the shaft 19, and finally into the rotary chamber 25 of the rotary unit 22 through the holes 24 thereof. Since the rotary unit 22 is being rotated in a high speed about the axes of bearings 26 and 27, the cooling and lubricating oil in the state of the turbid white emulsion entered into the rotational chamber 25 is forced to be rotated in a high speed under the temperature pretty higher than the atmospheric temperature, so that the water particles in the emulsion are collected on the outer wall 28 side of the rotational chamber 25, and the oil only is ejected from the ejection nozzles 31 of the dependent chambers 30 at the bottom of the rotational chamber 25 into the low pressure chamber 32 through the drum-like filter 29 disposed in the rotational chamber 25. The cooling and lubricating oil which is ejected into the low pressure chamber 32 and which has been fully separated from water particles is collected in the bottom chamber 33 and flows into the conduit 15.

Owing to the reaction of the cooling and lubricating oil ejected from the ejection nozzles 31 into the low pressure chamber 32, the rotary unit 22 is automatically rotated in a high speed merely by making use of the flow of fluid contained in itself without being assisted by any external power source.

Figure 3:
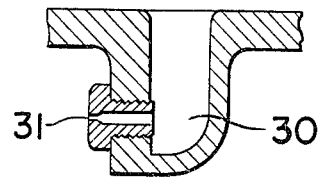
FIG. 3 is a fragmentary enlarged view in section taken along the line A—A in FIG. 2.

One of the ejection nozzles 31 is in detail shown in FIG. 3, and the configuration and the dimensions thereof can be modified as desired so as to obtain any desirable number of rotations of the rotary unit 22, as well as to desirably regulate the amount of the cooling and lubricating oil to be passed flowing through the centrifugal water separator 14. On the other hand, in FIG. 2, the water particles separated out of the emulsion and collected on the outer wall 28 side of the rotational chamber 25 is discharged to the exterior thereof through the valve 34 which is automatically operated by detecting the amount of water gathered thereonto. The valve 34 may be instead substituted by any one of the manual type, or else, by an automatic valve which is automatically opened on the basis of a predetermined interval.

Referring again to FIG. 1, should the arrangement shown in FIG. 1 be modified in such manners that the conduit 17 on the outlet side of the centrifugal water separator 14 is connected to the inner bottom of the pressure vessel and oil separator 2, and that the conduit 13 on the inlet side of the centrifugal water separator 14 is connected to the conduit 7, in other words, modified in such ways that the centrifugal water separator 14 is disposed in the circulating system of the cooling and lubricating oil flowing from the pressure vessel and oil separator 2 to the compression chamber in the compressor 1, and that the cooling and lubricating oil in the bottom part of the pressure vessel and oil separator 2 is led into the centrifugal water separator 14 and the same oil is then returned to the bottom part of the pressure vessel and oil separator 2, these modifications of the arrangement would be included as a matter of course in the scope of the present invention.

Figure 4:
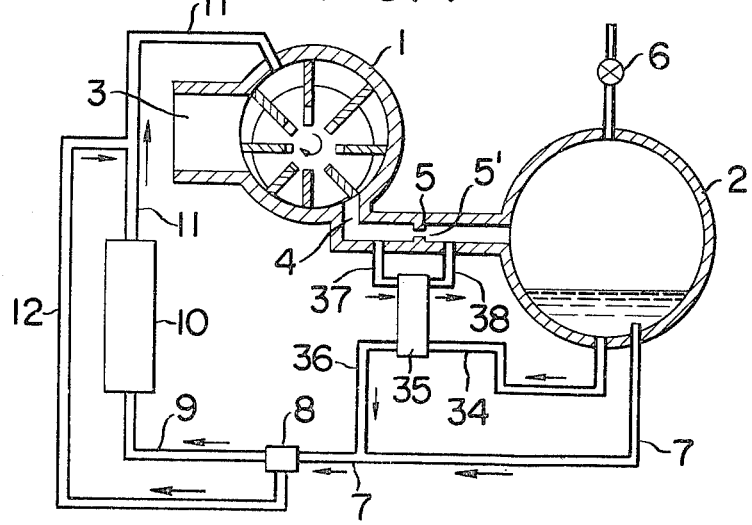
FIG. 4 and FIG. 5 each are a circulating system diagram of cooling and lubricating oil individually in an oil injection type rotary compressor respectively showing another embodiment of the present invention.

FIG. 4 shows another embodiment of the present invention, in which the flow of compressed gas within a compressor is made use of as the power source for its centrifugal water separator.

The essential components of the arrangement shown in FIG. 4 are identical with those shown in FIG. 1, but, in FIG. 4, connected to the bottom of the pressure vessel and oil separator 2 is a conduit 34 to which connected in sequence are a centrifugal water separator 35 and a conduit 36, and the conduit 36 is further interconnected with the conduit 7 which admits the inner bottom of the pressure vessel and oil separator 2 to communicate with the temperature regulating device 8.

The outlet pipe 5 is provided therein with, for example, and orifice 5', and the individual one ends of an introducing pipe 37 and a discharging pipe 38 are both connected to the outlet pipe 5 respectively at the upstream and the downstream of the orifice 5', whereas, the other ends of the introducing pipe 37 and the discharging pipe 38 are both connected with the centrifugal water separator 35.

Figure 5:
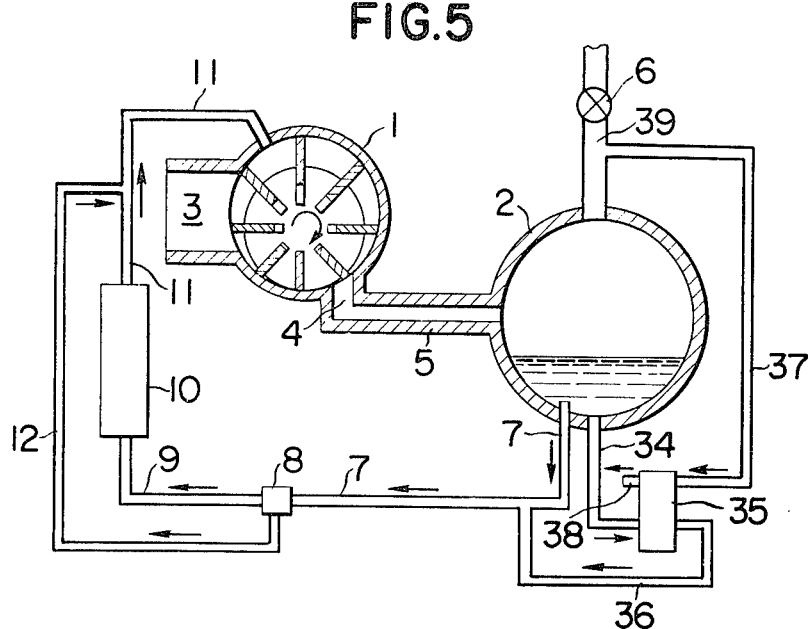

The essential components of the arrangement shown in FIG. 5 are identical with those shown in FIG. 4, but, in FIG. 5, the introducing pipe 37 is connected to an outlet pipe 39 which admits the pressure vessel and oil separator 2 to communicate with the service header 6, and the discharging pipe 38 is opened to the atmosphere.

Air is sucked from the suction port 3 into the compressor 1, and the pressurized gas compressed therein is discharged from the outlet port 4, then it is sent into the pressure vessel and oil separator 2 through the outlet pipe 5. The pressurized gas is sent out to the exterior thereof through the service header 6.

The cooling and lubricating oil is stored in the bottom part of the pressure vessel and oil separator 2, and the stored oil is thereafter ejected on account of the pressure of the pressurized gas into the compression chamber of the compressor 1 through a conduit 7, a temperature regulating device 8, a conduit 9, a cooler 10, and a conduit 11. However, in such a case where the temperature of the cooling and lubricating oil in the conduit 7 is low, a part of the cooling and lubricating oil is by-passed from the temperature regulating device 8 and is directly sent to the conduit 11 through a bypass conduit 12, without passing through the cooler 10, accordingly, the temperature of the cooling and lubricating oil ejected into the compression chamber of the compressor 1 is quickly brought to a definite value which is to be maintained at all times.

On the other hand, in the while the compressor 1 is continuously operated for a long time of hours, the water vapour contained in the atmosphere is condensed to become varied to water particles, and the water particles are mixed with the cooling and lubricating oil so as to have it emulsified. The cooling and lubricating oil in the state of an emulsion is separated from the water particles by means of a centrifugal water separator 35 which is rotated in a high speed owing to the pressurized fluid, thereafter, the clean oil flows into the conduit 7 via the conduit 36.

This modified embodiment shown in FIG. 4 is featured in that, as the power source of the centrifugal water separator 35, the flow of the pressurized gas in the compressor i is made use of, and the pressure of the gas introduced into the introducing pipe 37 from the upstream of the outlet pipe 5 is made higher by 1 kg/cm$^2$ or more than the same discharged from the discharging pipe 38 into the downstream of the outlet pipe 5 on account of the orifice 5' or a venturi tube or the like disposed in the outlet pipe 5, the centrifugal water separator 35 is accordingly rotated by virture of this pressure difference higher than 1 kg/cm².

The modified embodiment shown in FIG. 5 is featured in that the compressed gas itself sent out from the compressor 1 to the exterior thereof is made use of as the power source to force the centrifugal water separator 35 to be rotated, and the compressed gas sent out toward the outlet pipe 39 is introduced into the introducing pipe 37, thereafter, the used gas is discharged to the atmosphere from the centrifugal water separator 35 through the discharging pipe 38, in other words, that the pressurized gas in the oil injection type rotary compressor is introduced into the centrifugal water separator 35 for the purpose of forcing the latter to be rotated in a high speed.

This embodiment can be further modified in such a way that the air flow sucked into or the gas flow discharged from, or the like, the internal combustion engine driving the compressor is introduced into the centrifugal water separator 35 as the power source thereof, and the used air or gas is discharged into the atmosphere, and such kinds of modifications are also included in the scope of the present invention.

In addition, the centrifugal water separator 35 in FIG. 4 and FIG. 5 is arranged to as to be connected to the bottom part of the pressure vessel and oil separator 2 and to be interposed within the circulating system of the cooling and lubricating oil, however, the arrangement can be modified completely similarly to that in the case of FIG. 1 in such ways that the centrifugal water separator 35 is disposed in the circulating system of the cooling and lubricating oil flowing from the pressure vessel and oil separator 2 to the compression chamber of the compressor 1, and that the cooling and lubricating oil in the bottom part of the pressure vessel and oil separator 2 is introduced into the centrifugal water separator 35 and the cooling and lubricating oil discharged therefrom is returned into the bottom part of the pressure vessel and oil separator 2, and such kinds of modifications are also included in the scope of the present invention, too.

Figure 6:
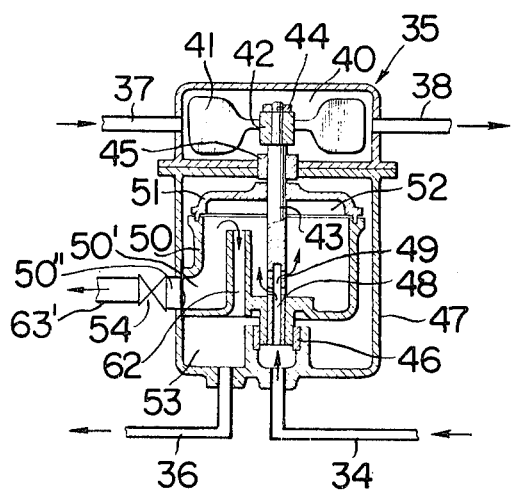
FIG. 6 is a sectional elevation view showing a water separator by the centrifugally separating process in accordance with another embodiment of the present invention.

FIG. 6 shows the centrifugal water separator 35 in detail, and the separator 35 is comprised of a vane chamber 40 and a hollow body 47 disposed underneath the vane chamber 40, and an introducing pipe 37 is connected to one side of the vane chamber 40, whereas, a discharging pipe 38 is connected to the other side thereof. A vertical shaft 43 is provided on the vertical center axes of the vane chamber 40 and the hollow body 47, and the vertical shaft 43 is rotatably journalled in the separator 35 by means of two bearings 45 and 46.

Within the vane chamber 40, a hub 42 of vanes 41 is fixed onto the upper end of the shaft 43 by means of a nut 44. Within the hollow body 47, the shaft 43 is provided at its lower part with an elongated shaft hollow 48 which communicates with a conduit 34 at its lower end and with a centrifugal chamber 52 to be described below through a hole 49 which communicates with the shaft 43 at the upper part of the shaft hollow 48. Further within the hollow body 47, a rotor 50 and a cover 51 thereof are rigidly fixed onto the shaft 43, and the aforesaid centrifugal chamber 52 is constituted by the enclosure of both the rotor 50 and a cover 51 thereof. An oil chamber 53 is provided under the centrifugal chamber 52 within the hollow body 47. The bottom plate of the rotor 50 is provided with a tubular passage 62 which is upwardly projected therefrom into the centrifugal chamber 52 and through which the centrifugal chamber 52 communicates with the oil chamber 53.

The rotor 50 is provided on its one side with an aperture 50' which is capable of being coincided with an aperture 50" provided on one side of the body 47, and a conduit pipe 63' which is connected to the aperture 50" of the body 47 is provided therein with a valve 54.

The pressurized fluid to be functional as the power source of the centrifugal water separator 35 in the while the compressor is operated is introduced through the introducing pipe 37 into the vane chamber 40 so as to force the vanes 41 to be rotated in a high speed, it is thereafter discharged out of the vane chamber 40 through the discharging pipe 38. The vanes 41 are constructed integrally with the hub 42 and fixed onto the shaft 43 by means of the nut 44. The shaft 43 rotatably supported on the bearings 45 and 46 is therefore rotated together with the vanes 41.

On the other hand, the cooling and lubricating oil is sent through the conduit 34 into the shaft hollow 48 within the shaft 43 via the central hole at the bottom of the body 47 of the centrifugal water separator 35, and it is further sent through the hole 49 of the shaft 43 into the centrifugal chamber 52 which is formed by the enclosure of both the rotor 50 and the cover 51 thereof.

The rotor 50 and the rotor cover 51 is constructed integrally with the shaft 43 so as to be rotated together therewith. Therefore, the cooling and lubricating oil in the state of the turbid white emulsion entered into the centrifugal chamber 52 is rotated in high speed under a temperature pretty higher than the atmospheric temperature, consequently, water particles are collected on the inner peripheral surface of the outer wall of the centrifugal chamber 52, and the clean cooling and lubricating oil having no water particles, which have been separated out therefrom, is sent out to the conduit 36 through the tubular passage 62 and the oil chamber 53. In addition, the water collected on the inner peripheral surface of the outer wall of the centrifugal chamber 52 is discharged therefrom to the exterior of the separator through the valve 54 which is automatically operated when the gathered water is detected thereby. This valve 54 may be instead substituted by any one of the manual type or such a device which is automatically opened in a predetermined interval.

The vanes 41 is illustrated in FIG. 6 as a construction to force the centrifugal water separator 35 to work, however, the construction is not restricted to the vanes 41, and any one of other constructions may be instead put to use therefore so long as it is functional to be rotated by pressurized fluid introduced thereinto.

Moreover, in such a case where, as a power source to have the centrifugal water separator 35 rotated in high speed, although such a power source is not shown in the drawings, a DC or AC electric motor is made use of, or else, an air motor or another electrical or mechanical means is put to use therein, these means are all included in the scope of the present invention.

Figure 7:
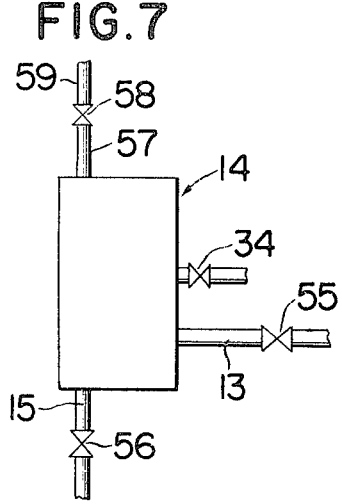
FIG. 7 is a side view showing a water separator by the centrifugally separating process in accordance with a further embodiment of the present invention.

Furthermore, as shown in FIG. 7, the present invention can be applied to a practical use in such a way that, an introducing conduit 13 of the centrifugal water separator 14 for the cooling and lubricating oil is provided with a valve 55; a discharging conduit 15 thereof for the cooling and lubricating oil is provided with a valve 56; a conduit 57 is further provided so as to be able to communicate with the cooling and lubricating oil within the centrifugal water separator 14, one side of a valve 58 is connected to the conduit 57; and that the other side thereof is connected to a conduit 59 which is in turn connected to the suction port 3 (refer to FIG. 1) of the compressor 1, whereby, when the water particles contained in the cooling and lubricating oil within the centrifugal water separator 14 is separated therefrom, both valves 55 and 56 are first closed, and after several seconds have passed on therefrom, the valve 58 is opened to release the internal pressure within the centrifugal water separator 14, thereafter, the valve 34 is opened to discharge water gathered in the centrifugal water separator 14, immediately thereafter, the valve 34 and 58 are closed, and after several seconds therefrom, the valve 55 and 56 are opened so as again to introduce the cooling and lubricating oil into the centrifugal water separator 14 and to allow the water particles therein to be separated therefrom, and when the water particles are separated, the operations of valves as described above are again repeatedly carried out so as to allow the water particles in the cooling and lubricating oils to be entirely and surely removed therefrom, and this application is also included in the scope of the present invention.

The aforesaid operations of such valves as shown in FIG. 7 can be carried out by manually operating them with hands, too, or else, all of the valves can be automatically operated by detecting the water collected in the centrifugal water separator or by making use of an appropriate time intervals, and otherwise, the operations can be automatically carried into effect by the use of any prepared program in which any appropriate time interval is set up among the respective operations of the individual valves.

Figure 8:
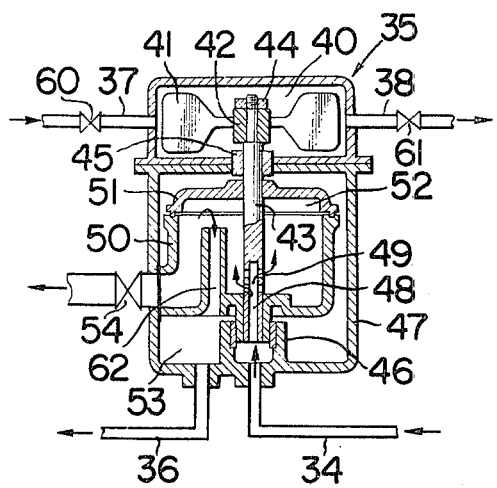
FIG. 8 is a sectional elevation view showing a water separator in accordance with a further modified embodiment of the present invention.

Furthermore, as shown in FIG. 8, the introducing pipe 37 for introducing the pressurized fluid in order to have the centrifugal water separator 35 rotated is provided with a valve 60, and if necessary, the discharging pipe 38 is provided with a valve 61, whereby, the centrifugal water separator 35 can be economically operated in several ways such that the valves 60 and 61 are automatically opened to admit the centrifugal water separator 35 to be operated by automatically detecting the collected water only at the time when the cooling and lubricating oil in the bottom of the pressure vessel and oil separator 2 is emulsified by the water particles, and that the valves 60 and 61 are manually opened to allow the centrifugal water separator 35 to be operated, and further that by making use of any prepared program according to which the valve 60 and 61 are automatically operated intermittently in response to the degree of the emulsification within the compressor 1, the centrifugal water separator 35 is operated so as to have the water particles separated completely thereby as well as to minimize the power loss in dependence with the operation.

In the cases, too, where the centrifugal water separator 35 is rotated by any one of electrical or mechanical powers, it is possible completely similarly to the aforementioned cases to have the separator 35 intermittently operated by hand, or to have it intermittently operated automatically by the detection of the emulsificated status, or else, to have it intermittently operated in accordance with the prepared program.

As described hereinabove, according to the present invention, it becomes possible that the water particles contained in the cooling and lubricating oil in the state of the turbid white emulsion are easily separated therefrom and discharged to the exterior of the compressor while it is being operated by means of the centrifugal water separator which is disposed in the flow of the cooling and lubricating oil under the temperature pretty higher than the atmospheric temperature, therefore, it is effective in that the temperature of the cooling and lubricating oil supplied to the compressor can be lowered so as to enable the suction and the cooling efficiencies to be remarkably improved.

Figure 9:
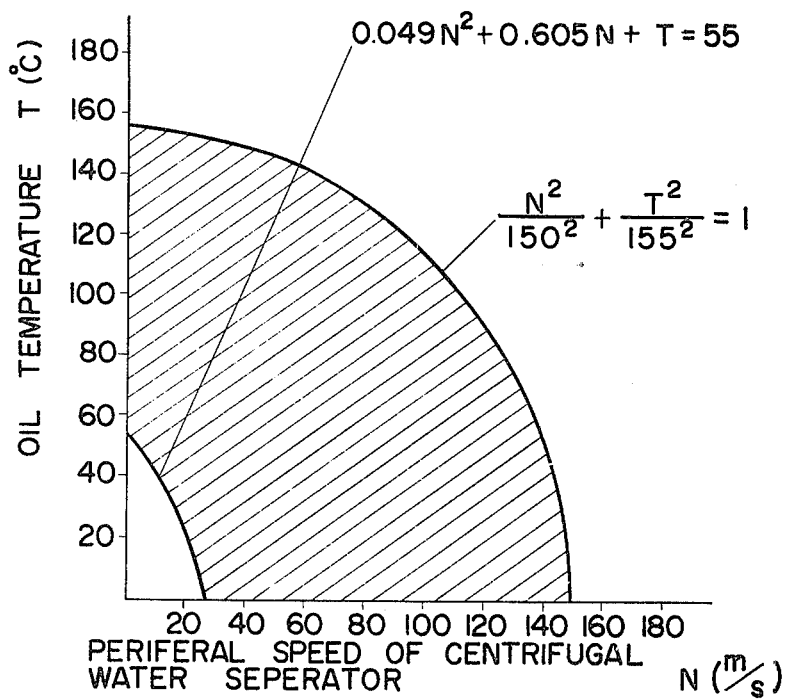
FIG. 9 is a graph showing the relation between peripheral speed N of the centrifugal water separator and temperature T of lubricating oil in the embodiment of the present invention.

In all of the above embodiments, peripheral speed N m/sec of the centrifugal water separator and temperature T°C of the lubricating oil are defined within the range shadowed portion in FIG. 9 where the upper limit is expressed by $$\frac{N^2}{150^2} + \frac{T^2}{155^2} = 1$$

and the lower limit is expressed by $$0.049\ N^2 + 0.605\ N + T = 55$$

oil and water can be perfectly and easily separated from each other under any condition and water can be removed from the device. As a result, the pressure of the compressor can be further elevated so as to enable the range of the working pressure of the oil injection type rotary compressor to be further extended, in addition, the compressor can be continuously operated without trouble for a long time of its continuous working hours.

Moreover, due to the process in which the cooling and lubricating oil is centrifugally rotated, removed are not only the water particles in the cooling and lubricating oil but also the minimal dusts, carbons, and the like contained in the oil together with the water particles, accordingly, the compressor is operated under low temperature without any worry about the emulsification, and therefore, it becomes unnecessary to worry about the oxidation of the oil, in addition, the working life of the oil has been certainly extended so much as ten times in comparison with that put to use in any conventional compressor. Therefore, it is noted that superior effects are brought into the rotary compressor by the present invention as described hereinabove.

What is claimed is:

1. In combination, an oil injection type rotary compressor having a centrifugal water separator disposed in the cooling and lubricating system thereof, said compressor having a discharge port from which gas is discharged under pressure, and which is in communication with said water separator through a pressure vessel and oil separator, said centrifugal water separator having a rotary unit, means, having inlet and outlet sides, driving said rotary unit to separate water particles, contained in the oil, from the oil, other means maintaining a fluid pressure at said inlet side corresponding to the pressure of the gas discharged from said compressor, further means maintaining a fluid pressure at said outlet side which is lower than that at said inlet side, wherein said other means includes conduit means disposed between said pressure vessel and oil separator and said inlet side of said means, said conduit means providing a flow path for the oil, and water container therein, and received from said pressure vessel and oil separator, and wherein said further means includes a pump means disposed between said outlet side of said means and said pressure vessel and oil separator, whereby the pressure differential across said means causes said rotary unit to be revolved and thereby discharge the water particles from said separator.

2. The combination as defined in claim 1 wherein the pressure differential is higher than 1 kg./cm$^2$.

3. In combination, an oil injection type rotary compressor having a centrifugal water separator disposed in the cooling and lubricating system thereof, said compressor having a discharge port from which gas is discharged under pressure, and which is in communication with said water separator through a pressure vessel and oil separator, said centrifugal water separator having a rotary unit, means, having inlet and outlet sides, driving said rotary unit to separate water particles, contained in the oil, from the oil, other means maintaining a fluid pressure at said inlet side corresponding to the pressure of the gas discharged from said compressor, further means maintaining a fluid pressure at said outlet side which is lower than that at said inlet side, wherein said compressor is in communication with said pressure vessel and oil separator through conduit means, said conduit means having a restricted portion therein, said other means including a first conduit connected between said inlet and said conduit means and in communication with said conduit means between said restricted portion and said discharge port, and said further means is a second conduit connected between said outlet and said conduit means in communication with said conduit on the side of said restricted portion opposite said first conduit, whereby the pressure differential across said means causes said rotory unit to revolve and thereby discharge the water particles from said separator.

4. In combination, an oil injection type rotary compressor having a centrifugal water separator disposed in the cooling and lubricating system thereof, said compressor having a discharge port from which gas is discharged under pressure, and which is in communication with said water separator through a pressure vessel and oil separator, said centrifugal water separator having a rotary unit, means, having inlet and outlet sides, driving said rotary unit to separate water particles, contained in the oil, from the oil, other means maintaining a fluid pressure at said inlet side corresponding to the pressure of the gas discharged from said compressor, further means maintaining a fluid pressure at said outlet side which is lower than that at said inlet side, wherein said other means is another conduit means disposed between said pressure vessel and oil separator and said inlet side of said means, said another conduit providing a flow path for the gas under pressure in said pressure vessel and oil separator and wherein said further means is a still another conduit leading from said outlet side to atmosphere, whereby the pressure differential across said means causes said rotary unit to revolve and thereby discharge the water particles from said separator.

* * * * *